Feb. 18, 1930.  H. POUNDS ET AL  1,747,793
TRACTOR TRAILER SPRAYER
Filed July 20, 1928
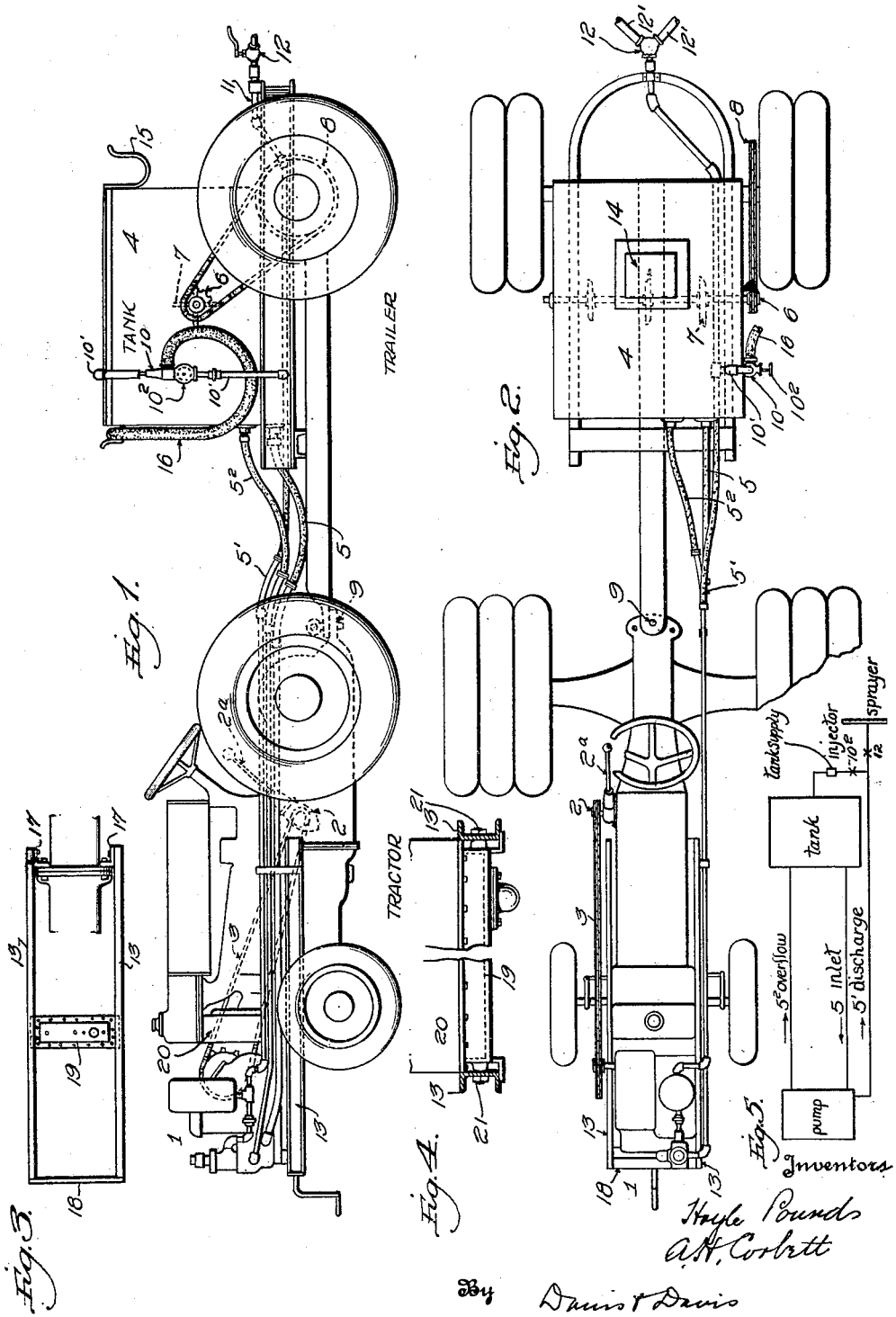

Patented Feb. 18, 1930

1,747,793

UNITED STATES PATENT OFFICE

HOYLE POUNDS AND ALFRED H. CORBETT, OF WINTER GARDEN, FLORIDA

TRACTOR-TRAILER SPRAYER

Application filed July 20, 1928. Serial No. 294,263.

The object of this invention is to provide a simple and inexpensive attachment for motor-driven tractors adapted for spraying trees and other vegetation, as more fully hereinafter set forth.

In the drawing—

Fig. 1 is a side elevation of a tractor provided with our attachment;

Fig. 2 is a plan view thereof;

Fig. 3 is a plan view of the pump-supporting frame;

Fig. 4 is a transverse sectional view thereof;

Fig. 5 is a diagram in miniature of the liquid-handling elements.

Referring to the drawing annexed by reference-characters, 1 designates generally a pump plant mounted in front of the radiator of the tractor upon a pair of I-beams 13. This pump is driven through the medium of a sprocket-chain 3 running over a sprocket-wheel on the driving-shaft of the pump and a driving-pinion 2 affixed to one of the shafts of a two-speed transmission gearing geared to the usual auxiliary shaft provided in the Fordson tractor, the shift-lever of which is shown at $2^a$.

A tank 4 for the liquid insecticide is mounted on a trailer whose draw-bar is pivotally attached to the differential-casing of the tractor by a vertical pivot-bolt 9. A rotary stirrer 7 is mounted in the tank 4 and is driven by a sprocket-chain running over a sprocket-wheel 6 to a sprocket-wheel 8, the latter being mounted on the rear axle of the trailer and being driven by the traction thereof.

Three pipes 5, 5′ and $5^2$ extend backwardly from the pump; the pipe 5 extends from the bottom of the tank to the inlet of the pump, and the pipe 5′ extends from the outlet of the pump rearwardly to the rear-end of the tractor, where it is provided with a valve 12 and two or more branch pipes 12′ leading to the spray-nozzles (not shown). The other pipe $5^2$ extends backwardly from the overflow of the pump to the tank, to thus use the overflow for the purpose of assisting the stirrer 7 in agitating the liquid contents of the tank. All three pipes have flexible connections between the trailer and the tractor, to thus permit the trailer to swing laterally without disrupting the piping system.

The tank 4 may be preliminarily filled through the manhole 14 on the top of the tank, and, after the apparatus is put into operation, the tank may be refilled from time to time through the medium of an inspirator device 10 located in a pipe 10′ connecting the delivery-pipe 5′ to the top of the tank, a valve $10^2$ being provided for controlling the operation of the inspirator. An inlet-pipe 16 is connected to the inlet of the inspirator and this pipe is made flexible in order that it may have its inlet-end conveniently inserted in a barrel or other vessel containing the disinfectant to be delivered into the tank 4. While the pump is in operation and the valve $10^2$ is open and valve 12 is closed, liquid will pass up from the delivery-pipe 5 through pipe 10′ into the tank and entrain by suction the fresh liquid that is drawn in through pipe 16, thus utilizing the pump for refilling the tank.

The pump-supporting beams 13 are detachably attached to the tractor in any suitable manner. A pair of these beams is employed, one at each side of the tractor, inside of the wheels. At the rear-end, each beam is connected to the casing of the tractor by a bracket 17. At the forward-ends, the beams 13 are connected to the tractor detachably in any suitable manner.

It will be observed that a feature of importance lies in the fact that the overflow from the pump is carried back and utilized to agitate the contents of the tank, to thus keep the liquid insecticide in prime condition for spraying. Another feature of advantage is that the pump is so located, namely, forward of the motor of the tractor, that it balances the weight of the forward-end of the trailer which is, of course, supported by the tractor, the trailer being of the two-wheel type.

We prefer connecting the forward ends of the channel-beams 13 by a cross-bar 18 through a hole in which the shaft of the usual starting crank may be passed. We also prefer connecting the beams at points between their length by a member 19 which conveniently forms the bottom of the usual radiator 20 of the tractor, the ends of this member 19 being connected to the channel-beams by bolts 21 and the main part of its weight (consisting principally of the tank 4) being located forward of the wheels.

What we claim as new is:

1. In a sprayer of the type set forth, the combination with a tractor, of an apparatus detachably connected to the tractor embodying a two-wheel trailer carrying a tank located in front of said wheels, a pump plant mounted on the tractor in advance of its front wheels to thereby tend to balance the weight of the trailer, a pump-inlet-pipe connecting the tank to the pump, and a pump-outlet-pipe extending from the pump to the rear of the trailer.

2. In a sprayer of the type set forth, the combination with a tractor, of an apparatus detachably connected to the tractor embodying a trailer carrying a tank, a pump plant mounted in front of the tractor to thereby tend to balance the weight of the trailer, a pump-inlet-pipe connecting the tank to the pump plant, and a pump-outlet-pipe extending from the pump plant to the rear of the trailer and provided with a closure valve, said rearwardly-extending pipe having a branch in advance of said valve connecting it to the tank, an inspirator in said branch and a valve ahead of said inspirator, the inspirator being connected to a flexible suction-pipe.

In testimony whereof we hereunto affix our signatures this 3d day of July, 1928.

HOYLE POUNDS.
ALFRED H. CORBETT.